Jan. 25, 1927.  
W. A. MITCHELL  
1,615,809  
CHAIN ROLLER BEARING AND THE LIKE  
Filed Feb. 19, 1926

W. A. Mitchell  
INVENTOR  
By: Marks & Clerk  
ATTYS

Patented Jan. 25, 1927.

1,615,809

UNITED STATES PATENT OFFICE.

WALTER ASHBY MITCHELL, OF DUNDEE, SCOTLAND.

CHAIN ROLLER BEARING AND THE LIKE.

Application filed February 19, 1926, Serial No. 89,484, and in Great Britain December 29, 1924.

This invention relates to integral or one-piece crank shafts adapted to be fitted with connecting rods having undivided or one-piece big-ends for threading over the crank webs into position and the invention has in view the adaptation and combination of parts adapted to enable chain rollers such as known in connection with chain roller bearings generally, to be employed in connection with crank shafts of the above type.

Chain roller bearings in general are made up in chain lengths which are applied by lapping them around an inner bearing and connecting the ends of the chain length together as, for example, by means of a detachable link.

It will be appreciated that the known form of one-piece crank and one-piece connecting rod big-end and outer race member are not adapted to receive chain roller bearings and it is not possible to apply such roller chain thereto.

The object of the invention is to provide a crank shaft unit of the above character to which chain roller bearings of the above kind can be applied.

It is preferred for the purposes of the invention to employ a roller chain of the type comprising a plurality of rollers which are positioned closely together around an inner race and rotatably mounted upon relatively fixed spindles or hubs which are connected together by a series of inner and outer pairs of links upon each side of the rollers.

The invention consists in a crank shaft of the type described wherein the crank pins or trunnions are provided with inner race members having a clearance to one side thereof and between such race and the adjacent crank web, of not less width than that of the connecting rod big-ends or outer races so that the latter may be threaded into position and temporarily located alongside of the races while the roller chains are being applied.

The inner races are preferably formed integral with the shaft or crank pins by locally hardening them in the position to be occupied by the rollers and it is further preferred to form the inner races by providing grooves or sunk roller beds between flanges formed in a part which is locally increased in diameter.

According to the above method an integral crank shaft having or combined with a chain roller bearing is produced as a unit.

In the accompanying drawings:—

Figure 1:
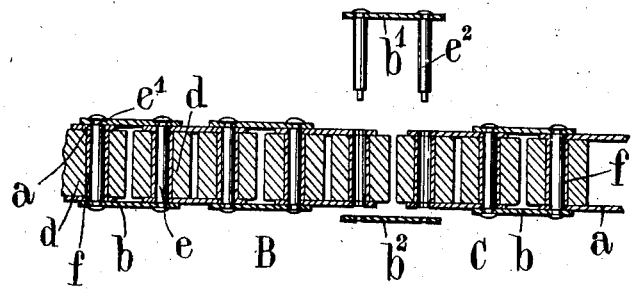
Figure 1 is a plan view, partly in section, of a roller chain showing a method of connecting the ends together.

In practical application of the invention it is preferred to employ roller chains of the known type wherein the outer links are secured to the roller spindles and the inner links are freely fulcrumed thereon. The roller chains may be made up and provided with a detachable link or the chain may be constructed according to the method described hereinafter, wherein a length of roller chain (such, for example, as illustrated at A, Figures 3 and 4) appropriate to the circumference of the inner race to which it is to be applied is made up. The roller chain consists of inner links $a$, outer links $b$, rollers $d$ and spindles $e$ which are provided with shoulders $e'$. The rollers and spindles are preferably provided with bushing sleeves $f$. The outer links for the main or standing part of the chain are riveted to the spindles so that a pair of spindles and their outer links constitute a rigid carriage member for their rollers. The ends of this roller chain length are shown at B and C, Figure 1. Both ends are provided with a pair of free inner links between which a pair of rollers are inserted and registered. The uniting link is formed of an outer link $b'$ to which a pair of spindles $e^2$ have been riveted and a free outer link $b^2$ is provided. When the chain connection is ready to be made the spindles $e^2$ are inserted in the registered apertures and bores of the rollers or their bushes, the outer link $b^2$ is positioned over the ends of the inserted spindle $e^2$ and these ends are then riveted over.

Figure 2:
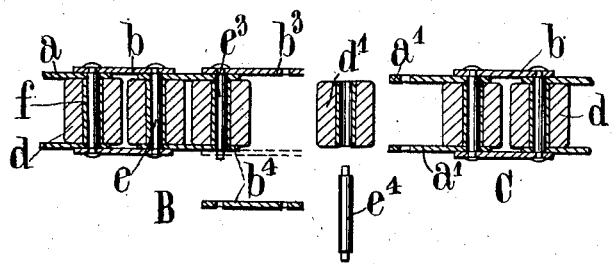
Figure 2 is a plan view, partly in section, of a roller chain showing an alternative method of connecting the ends of the chain together.

According to an alternative method (see Figure 2) one end, say for example the end B, of the chain length is provided with its spindle $e^3$ and one outer link $b^3$ riveted together, the other end of spindle $e^3$ being ready to receive a free outer link $b^4$. The final roller $d'$ and spindle $e^4$ are ready for insertion. The roller $d'$ is positioned between the ends of the inner links $a'$ and brought into register with respect to the link $b^3$ on the other chain end.

The spindle $e^4$ is then inserted and the outer link $b^4$ placed (in the roller position) over the projecting ends of the spindles $e^3$ and $e^4$ and these ends are riveted over.

Figure 4:
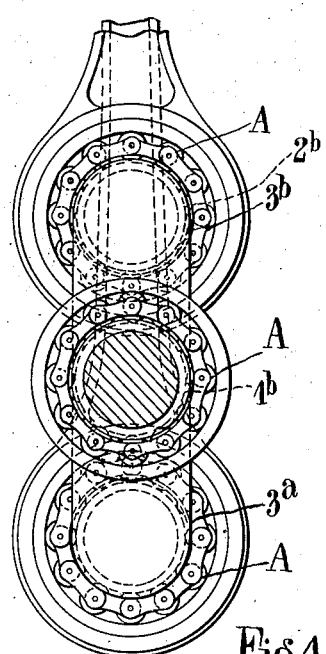
Figure 4 is a side sectional elevation of the crank element shown in Figure 3, and Figures 3, 5:
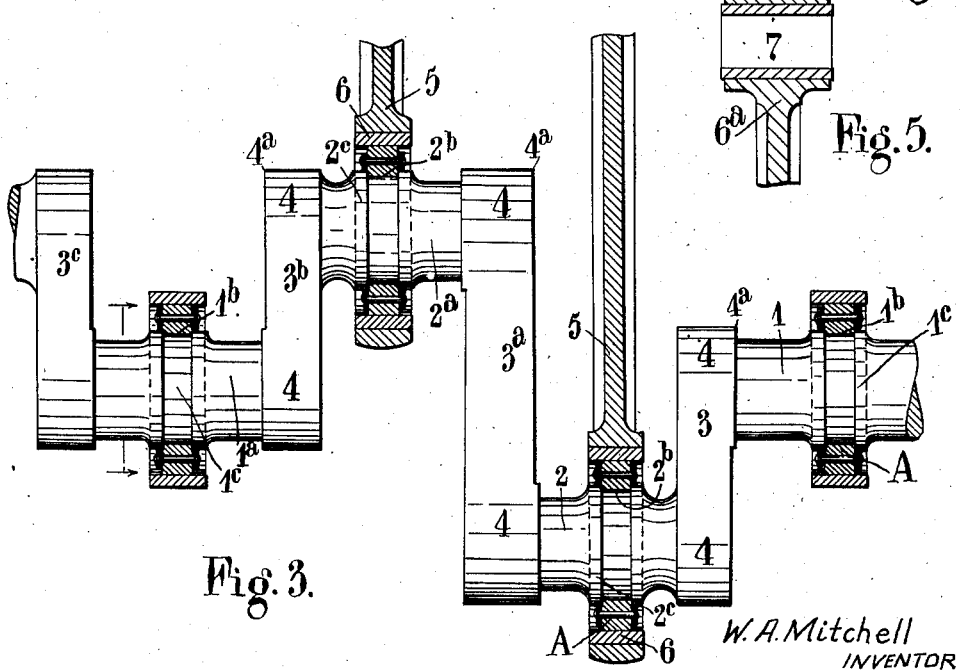
Figure 3 is a side elevation, partly in section, of an integrally formed crank element according to the invention in combination with chain roller bearings.
Figure 5 is a fragmentary section of an appropriate form of inner piston rod end for use in connection with the invention.

In Figures 3 and 4 is illustrated an appropriate construction and formation of integral crank member of the type embodying a plurality of crank pins and trunnions adapted to receive the outer races or other members by a threading process.

In carrying the invention into effect according to one convenient mode, as applied to a multi-throw crank shaft, the crank unit comprises shaft trunnion parts 1, $1^a$ (see Figures 3 and 4) and crank pins 2, $2^a$ connected by webs 3, $3^a$, $3^b$, $3^c$.

Both the trunnions and the crank pins are provided with recessed grooves $1^b$ and $2^b$, preferably formed in bosses or portion of enlarged diameter $1^c$ and $2^c$, the provision of the enlarged portion preventing weakening of the crank at the recessed parts and at the same time causing the diameter of the chain and outer race to be increased (or to be less reduced than otherwise would be the case where grooving is employed) thereby facilitating the threading method of introducing the outer races.

The groove parts of the crank pins and trunnions are locally hardened to afford a suitable running surface for the contact of the rollers, both as regards its bed surface and the lateral walls.

The shoulders 4 of the webs 3, $3^a$, $3^b$ and $3^c$ at the part where they adjoin the trunnions 1, $1^a$ and crank pins 2, $2^a$ and $2^b$ are of curved or semi-cylindrical form coaxial with the crank pin or trunnion, the radius being the same or only slightly larger than that of the crank pin or trunnion. The purpose of this formation is to provide clearance and enable the outer race member to be threaded over the trunnions, webs and cranks into position. If desired, the corners $4^a$ may be radiused or rounded off to afford further clearance for the threading operation.

For convenience in mounting or dismounting the bearings or big-end, a suitable clearance should be provided on one (as at $2^d$, Figure 3) or both sides of the inner race between the latter and the web or webs.

The big-ends of the piston rods 5 may be machined and hardened so that they are adapted to function as outer races without the application of separate race members. The big-end may be recessed so that a bed is formed for the rollers and an integral side flange is provided. In this form the opposite side of the roller bed is open and made closable by the application of a detachable side flange or annular member. Alternatively, the big-ends may house outer race members 6 which may be plain, as shown, or provided with side flanges, one or both of which may be detachable.

The shaft trunnion parts 1, $1^a$ are similarly provided with outer races suitably mounted and supported.

With a view to aiding in maintaining the position and alignment of the piston rod and big-end, the inner ends $6^a$ of the rods are provided with bushes 7 (see Figure 5) for the gudgeon pin of the piston, the bushes being formed to protrude beyond the ends $6^a$ and constitute distance pieces to prevent lateral displacement upon the pins by contact with the inner wall of the piston or bosses thereon.

In assembling the bearings and roller chains the outer races for the trunnion bearings and the big-ends are threaded consecutively into their approximate positions and temporarily laid alongside their inner races. The respective roller chains A are then lapped around the inner races and their ends coupled by riveting methods, such as described above, or by the employement of a detachable link such as described in British patent specification No. 121909*. The big-ends and outer race members may be now slid from their temporary position alongside the inner races over the rollers of the positioned roller chains, and where a detachable flange (or flanges) is required this (or these) is fitted.

Having now described my invention, what I claim as new and desire to secure by Letters Patent is:—

1. In a crank shaft of the type described the combination of one piece connecting rod big-ends, endless roller chains and crank pins carried by the one piece crank shaft, having inner races, clearances between such and the adjacent crank web of not less width than the connecting rod big-ends so that the latter may be threaded into position over the crank webs and temporarily located and allowed to reside alongside the inner races in the clearances while the roller chains are lapped around the races and their ends secured together, and means for maintaining the accurate alignment of the big-ends with respect to the inner races comprising bushes at the inner ends of the connecting rods adapted to protrude beyond the sides thereof to act as distance pieces with respect to the piston.

2. In a crank shaft of the type described the combination of one piece connecting rod big-ends for the crank pins, one piece outer race members for the trunnion between the crank webs, endless roller bearing chains, inner races on the crank pins and on the trunnions, clearances between the inner races on the trunnions and the crank webs and between the inner races on the crank pin and the crank webs, of not less width than the one piece outer races on the one hand, and the big-ends on the other, so that the outer races and big-ends may be threaded over the crank webs and temporarily located and allowed to reside alongside the inner races in the clearances while the roller chains are lapped around the inner races and their ends secured together, and means for maintaining the accurate alignment of the big-ends with respect to their inner races comprising bushes at the inner ends of the connecting rods adapted to protrude beyond the sides thereof to act as distance pieces with respect to the pistons.

In testimony whereof I have signed my name to this specification.

WALTER ASHBY MITCHELL.